United States Patent
Kim et al.

(10) Patent No.: US 9,886,152 B2
(45) Date of Patent: Feb. 6, 2018

(54) TOUCH SENSOR AND TOUCH SENSING METHOD

(71) Applicant: Dongbu HiTek Co., Ltd., Bucheon-si (KR)

(72) Inventors: Bo Sung Kim, Suwon-si (KR); Seung Ho Baek, Seoul (KR); Dong Hoon Lee, Geoje-si (KR)

(73) Assignee: Dongbu HiTek Co., Ltd., Bucheon-si (KR)

( * ) Notice: Subject to any disclaimer, the term of this patent is extended or adjusted under 35 U.S.C. 154(b) by 98 days.

(21) Appl. No.: 14/965,731

(22) Filed: Dec. 10, 2015

(65) Prior Publication Data

US 2017/0068349 A1   Mar. 9, 2017

(30) Foreign Application Priority Data

Sep. 9, 2015   (KR) .................. 10-2015-0127625

(51) Int. Cl.
*G06F 3/044* (2006.01)
*G06F 3/041* (2006.01)
*G09G 3/36* (2006.01)

(52) U.S. Cl.
CPC ............ *G06F 3/044* (2013.01); *G06F 3/0412* (2013.01); *G06F 3/0418* (2013.01); *G09G 3/3648* (2013.01); *G09G 2320/041* (2013.01); *G09G 2330/04* (2013.01); *G09G 2354/00* (2013.01)

(58) Field of Classification Search
None
See application file for complete search history.

(56) References Cited

U.S. PATENT DOCUMENTS

| | | | | |
|---|---|---|---|---|
| 2011/0115733 | A1* | 5/2011 | Shih | G06F 3/0412 345/173 |
| 2011/0298746 | A1* | 12/2011 | Hotelling | G06F 3/0418 345/174 |
| 2015/0015536 | A1* | 1/2015 | Chang | G06F 3/0412 345/174 |
| 2015/0206501 | A1* | 7/2015 | Kurasawa | G09G 3/2092 345/206 |
| 2017/0060295 | A1* | 3/2017 | He | G06F 3/044 |

* cited by examiner

*Primary Examiner* — Christopher Kohlman
(74) *Attorney, Agent, or Firm* — Andrew D. Fortney; Central California IP Group, P.C.

(57) ABSTRACT

A touch sensor includes a panel including display pixels and sensing nodes, a touch-sensing block configured to sense a change in capacitance of the sensing nodes, and a timing controller configured to generate state information based on a polarity of data and/or an inflow of electrostatic discharge to the panel and/or a peripheral temperature and/or an on or off state of the panel. The touch-sensing block senses a presence or absence of a touch on or over the sensing nodes based on the state information and the change in capacitance of the sensing nodes.

8 Claims, 6 Drawing Sheets

TOUCH SENSOR AND TOUCH SENSING METHOD

This application claims the benefit of Korean Patent Application No. 10-2015-0127625, filed on Sep. 9, 2015, which is hereby incorporated by reference as if fully set forth herein.

BACKGROUND OF THE INVENTION

Field of the Invention

Embodiments relate to a touch sensor and a touch sensing method.

Discussion of the Related Art

A touch sensor is a device attached to an image display device, for touching characters or figures displayed on a screen of the display device using a finger or other touch tool to input a user command. The touch sensor may convert a touch position of the user finger into an electrical signal which is used as an input signal.

Methods of implementing a touch sensor include a resistive method, a photo sensing method, a capacitive method, etc. The capacitive touch sensor senses change in capacitance between a person's hand (e.g., finger) and at least one conductive sensing pattern or a ground electrode to convert a touch position into an electrical signal, when the person's hand/finger or other object touches the touch sensor.

Recently, to reduce the thickness of portable terminals containing such display devices, an in-cell type display device, in which elements configuring a touchscreen are mounted in the display device, has been developed. In the in-cell type display, touch information is associated with the display, thereby influencing the display.

SUMMARY OF THE INVENTION

Accordingly, embodiments of the invention are directed to a touch sensor and a touch sensing method capable of accurately performing touch sensing and improving touch-sensing reliability.

Additional advantages, objects, and features of the invention will be set forth in part in the description which follows and in part will become apparent to those skilled in the art upon examination of the following or may be learned from practice of the invention. The objectives and other advantages of the invention may be realized and attained by the structure(s) particularly pointed out in the written description and claims hereof as well as the appended drawings.

To achieve these objects and other advantages and in accordance with the purpose(s) of the embodiments, as embodied and broadly described herein, a touch sensor may include a panel including display pixels and sensing nodes, a touch-sensing block configured to sense a change in the capacitance of the sensing nodes, and a timing controller configured to generate state information (e.g., a state signal) based on a vertical polarity of data provided to the panel (e.g., a vertical polarity control signal). The touch-sensing block senses the presence or absence of a touch on or over the sensing nodes based on the state information and the change in the capacitance of the sensing nodes.

The panel may be driven using a frame inversion method in which the polarities of data alternate in frame units. For example, the panel may further comprise a controller configured to alternate the polarities of the data in successive or adjacent data frames.

The touch-sensing block may include a sensing unit configured to output a change in raw data in response to the change in the capacitance of the sensing nodes, and a data processor configured to determine a presence or absence presence or absence of a touch on or over the sensing nodes based on the change in the raw data received from the sensing unit and the state information.

The data processor may control a reference data value used to determine the presence or absence presence or absence of a touch based on the state information (e.g., the state signal) and determine the presence or absence presence or absence of the touch on or over the sensing nodes based on the controlled reference data value and the change in raw data.

The data processor may correct the change in raw data based on the state information (e.g., the state signal) and determine the presence or absence of the touch on or over the sensing nodes based on the corrected change in the raw data and the reference data value (e.g., that is used to determine the presence or absence of a touch).

The display pixels may comprise or be grouped into a plurality of groups, where each of the plurality of groups may include two or more display pixels sharing a common electrode, and the common electrodes in the plurality of groups may be or comprise the sensing nodes.

The data processor may correct the change in raw data from the sensing nodes based on a difference between the number of positive polarity data and the number of negative polarity data provided to the plurality of display pixels (e.g., that may correspond to the sensing nodes).

According to another embodiment, a touch sensor may include a panel including display pixels and sensing nodes, a touch-sensing block configured to generate a change in raw data in response to a change in capacitance of the sensing nodes, and a timing controller configured to generate state information (e.g., a state signal). The touch-sensing block senses a touch on or over the sensing nodes based on the state information and the change in raw data, and the state information (e.g., the state signal) may be based on or may comprise electrostatic discharge (ESD) information, peripheral temperature information of the panel, and/or an on or off state of the panel.

The touch-sensing block may control a reference data value used to determine a presence or absence of the touch based on the state information and determine the presence or absence of the touch on or over the sensing nodes based on the reference data value (e.g., as controlled by the touch-sensing block) and the change in the raw data.

The touch-sensing block may correct the change in the raw data based on the state information and determine the presence or absence of the touch on or over the sensing nodes based on the corrected change in the raw data and the reference data value (e.g., that is used to determine the presence or absence of the touch).

According to another embodiment, a method of sensing a touch on or over a touch sensor having a panel including display pixels and sensing nodes includes generating a change in raw data in response to a change in the capacitance of the sensing nodes, generating state information based on at least one of a polarity of data for driving the panel, a peripheral temperature of the panel, the presence or absence of electrostatic discharge (ESD) into the panel, and/or an on or off state of the panel, and sensing the touch based on the state information and the change in the raw data.

Sensing the touch may include controlling a reference data value that is used to determine the presence or absence of a touch based on the state information, and determining the presence or absence of the touch on or over the sensing nodes based on the reference data value and the change in the raw data.

Sensing the touch may include correcting the change in raw data based on the state information, and determining the presence or absence of the touch on or over the sensing nodes based on the corrected change in the raw data and the reference data value (e.g., that is used to determine the presence or absence of the touch).

It is to be understood that both the foregoing general description and the following detailed description of embodiments are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle(s) of the invention. In the drawings.

DETAILED DESCRIPTION OF THE INVENTION

Figure 1:
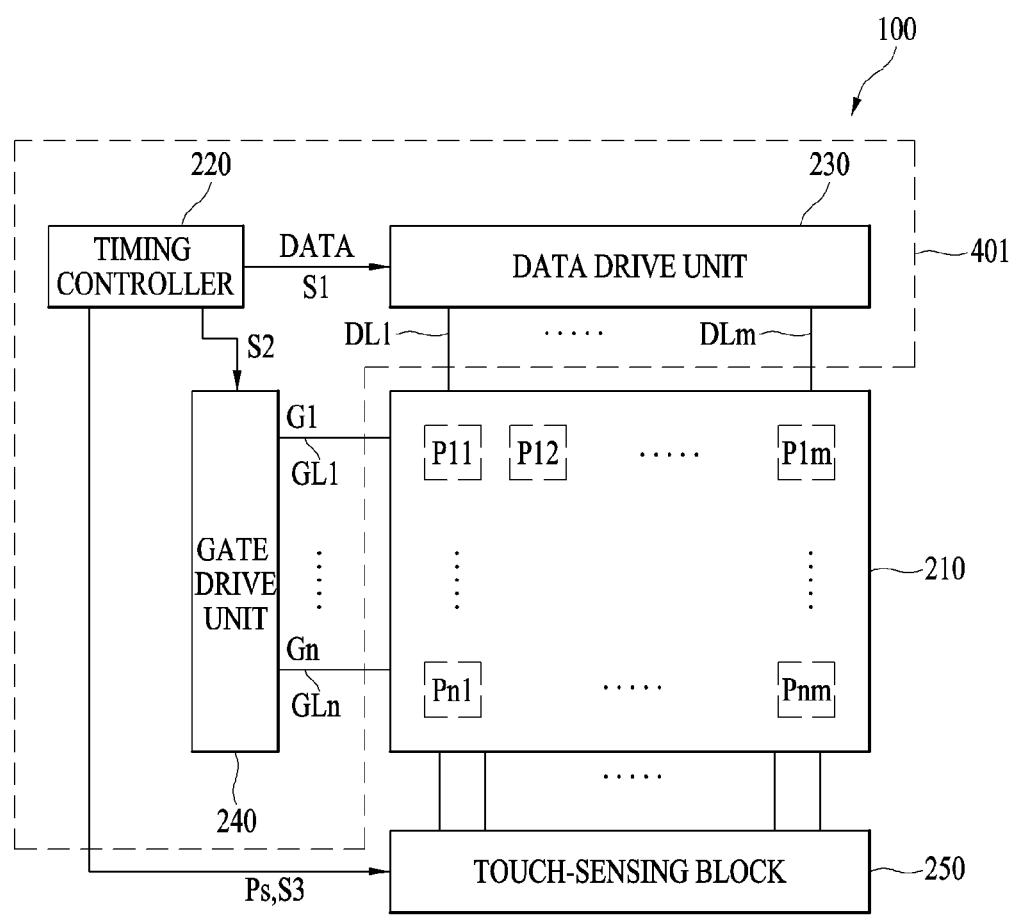
FIG. 1 is a diagram showing an exemplary configuration of a display device according to one or more embodiments of the invention.

Hereinafter, embodiments of the invention will be clearly appreciated through the accompanying drawings and the following description thereof. In the description of the various embodiments, it will be understood that, when an element such as a layer, film, region, pattern or structure is referred to as being "on," "over" or "under" another element, such as a substrate, layer, film, region, pad or pattern, it can be directly "on," "over" or "under" the other element or be indirectly "on," "over" or "under" the other element, with one or more intervening elements therebetween. It will also be understood that "on," "over" and "under" the element are described relative to the drawings.

In the drawings, the size of each layer may be exaggerated, omitted or schematically illustrated for clarity and convenience. In addition, the size and/or proportion of each constituent element may not wholly reflect an actual size thereof. In addition, the same reference numerals designate the same constituent elements throughout the description of the drawings.

FIG. 1 is a diagram showing an exemplary configuration of a display device 100 according to one or more embodiments of the present invention.

Referring to FIG. 1, the display device 100 may include a panel 210, a timing controller 220, a data drive unit 230, a gate drive unit 240 and a touch-sensing block 250. The display device 100 shown in FIG. 1 may be an in-cell type display device, and thus may comprise a plurality of display pixels in an array, configured to display one or more characters, figures, icons, fields, or combinations thereof, without being limited thereto. The display device 100 of FIG. 1 may also perform a touch sensing function and may also be referred to as a touch sensor.

The timing controller 220, the data drive unit 230 and the gate drive unit 240 may be implemented as or in, or be controlled by, a controller 401, which in one embodiment may comprise a display IC. In addition, the touch-sensing block 250 may be implemented as or in a touch sensing IC, without being limited thereto. For example, in addition to the configuration shown in FIG. 1, the controller or display IC 401 may further include sensing units 250-1 to 250-k (see, e.g., FIG. 7), and the data processor 252 shown in FIG. 7 may be implemented by an IC configured to determine the presence or absence of a touch and/or calculate touch coordinate information.

The controller 401 may drive the display of the panel 210 during a display period and sense touching of the panel 210 during a touch-sensing period.

The panel 210 may be or comprise a display panel including a touch sensor or a touchscreen. For example, the panel 210 may include an upper substrate (e.g., a first substrate with a color filter array thereon), a lower substrate (e.g., a second substrate with a TFT array thereon), and liquid crystal (e.g., a liquid crystal array) between the upper substrate and the lower substrate.

For example, the panel 210 may be or comprise a capacitive in-cell type panel, in which the time period of one frame is divided into a display period and a touch-sensing period. In one embodiment, the controller 401 may control or perform a display operation during a first period of time and control or perform a touch sensing operation during a second period of time, and the first and second periods of time constitute one frame.

Figure 2:
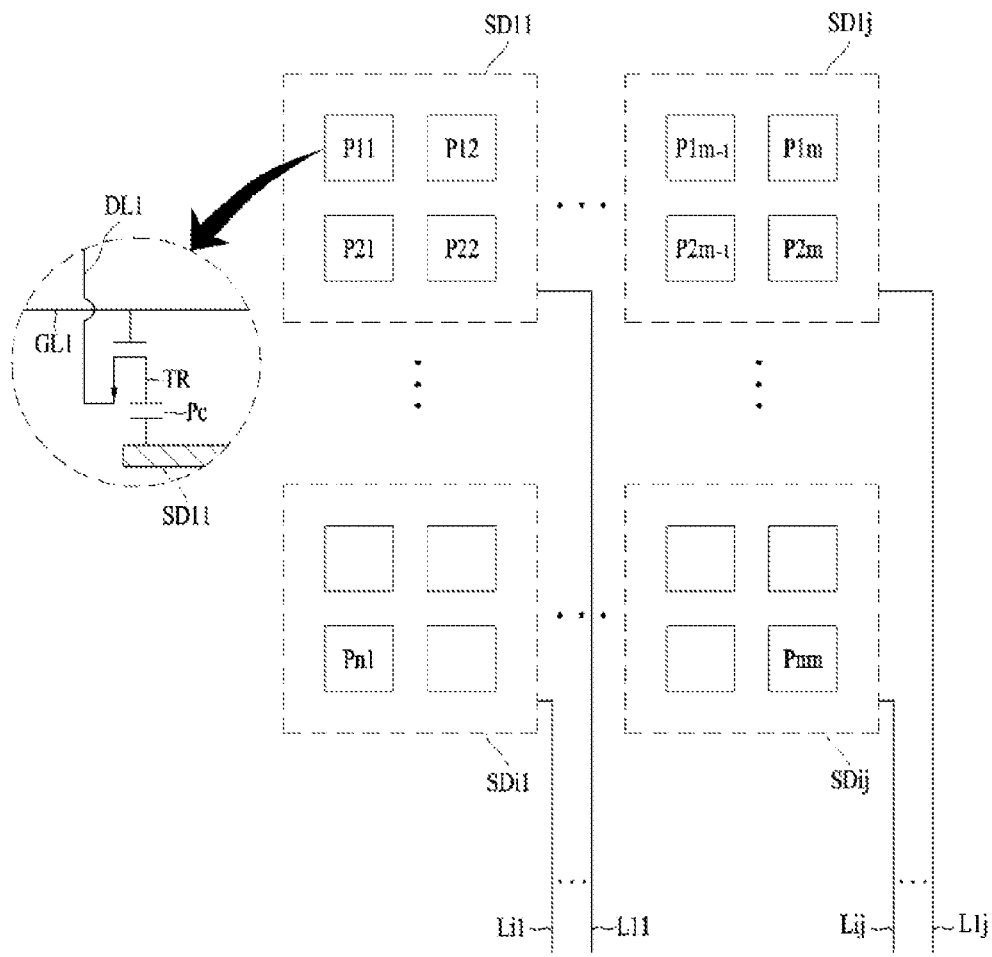
FIG. 2 is a diagram showing an exemplary embodiment of the panel shown in FIG. 1.

FIG. 2 is a diagram showing one exemplary embodiment of the panel 210 shown in FIG. 1.

Referring to FIGS. 1 and 2, the panel 210 may include data lines DL1 to DLm (m being a natural number greater than 1), gate lines GL1 to GLn (n being a natural number greater than 1), and display pixels P11 to Pnm (m and n being natural numbers greater than 1) configured to display one or more colors on or in the panel 210.

Each of the display pixels P11 to Pnm (m and n being natural numbers greater than 1) may include a pixel capacitor Pc and a transistor TR. The transistor TR may include a gate connected to the corresponding gate line (e.g., GL1), a source (or drain) connected to the data line (e.g., DL1) and a drain (or source) connected to one electrode of the pixel capacitor Pc.

In addition, the panel 210 may include a plurality of common electrodes SD11 to SDij (i and j being natural numbers greater than 1) connected to the complementary electrode of the pixel capacitors Pc in the display pixels P11 to Pnm (m and n being natural numbers greater than 1). Although four adjacent pixels (e.g., P11, P12, P21 and P22, arranged in a 2×2 array) form one group, and the pixels corresponding to one group share one common electrode in FIG. 2, embodiments are not limited thereto and may be variously implemented.

For example, the panel 210 may be divided into two or more groups, and each of the two or more groups may include a plurality of display pixels. In a color display panel, the display pixels belonging to the group may overlap.

Each of the common electrodes SD11 to SDij (i and j being natural numbers greater than 1) may be connected to the complementary electrode of each of the pixel capacitors Pc in one (e.g., SD11) of the groups.

The common electrodes SD11 to SDij (i and j being natural numbers greater than 1) may be used as electrodes for supplying a common voltage Vcom to the display pixels P11 to Pnm (m and n being natural numbers greater than 1) in order to drive the liquid crystal during the display period, and may also be used as electrodes for applying driving signals for touch sensing during the touch-sensing period.

For example, in the touch-sensing period, the common electrodes SD11 to SDij (i and j being natural numbers greater than 1 may serve as sensing nodes, coordinates,) sensing points, nodes or sensing node arrays.

In addition, touch sensing may be performed by sensing a change in the self-capacitance of the common electrodes or a change in the mutual capacitance between common electrodes (e.g., between a first common electrode and the common electrodes immediately adjacent thereto).

The term "gate lines" may be used interchangeably with the term "gate electrodes," the term "data lines" may be used interchangeably with the term "data electrodes," and the terms "gate electrode" and "data electrode" may be used interchangeably with the term "display electrode."

The panel 210 is exemplary, and various types of in-cell panels may be implemented in other embodiments.

Figure 6:
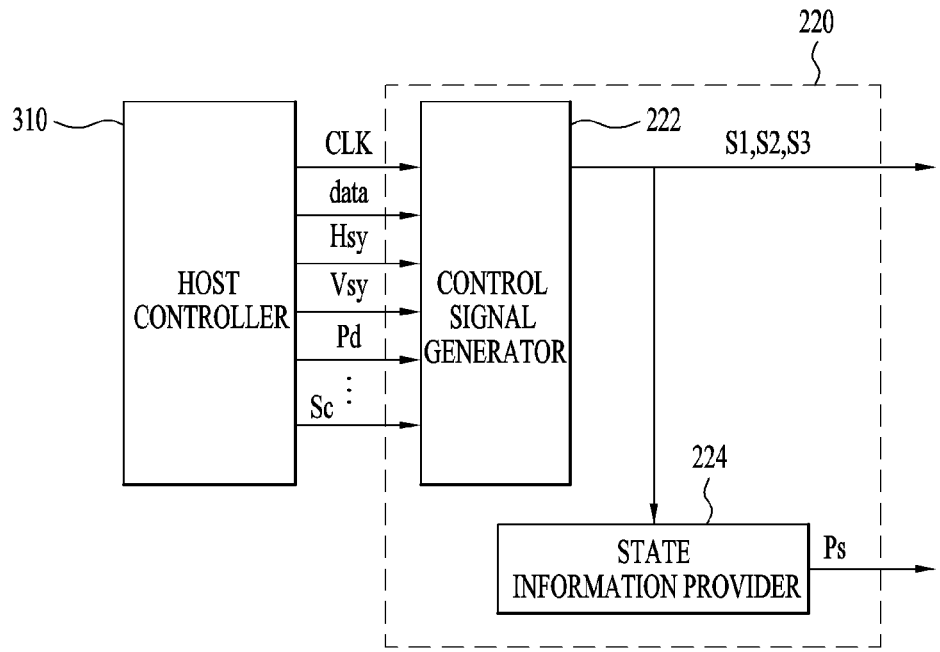
FIG. 6 is a diagram showing an exemplary embodiment of the timing controller shown in FIG. 1.

The timing controller 220 may generate a serial or multi-bit data signal DATA for driving the panel 210, a first control signal S1 for controlling the data drive unit 230, a second control signal S2 for controlling the gate drive unit 240, a third control signal S3 for controlling the touch-sensing block 250, and state information (e.g., a state signal) Ps indicating certain state information of the panel 210, based on various control signals (e.g., one or more of a timing signal CLK, a horizontal synchronization signal Hsy, a vertical synchronization signal Vsy, a frame timing (e.g., start-of-frame) signal Pd and a control signal Sc) and/or the data from a host controller (e.g., controller 310 in FIG. 6).

For example, the first control signal S1 may include a source start pulse, an enable signal, a source sampling clock, a vertical polarity control signal POL, a horizontal polarity control signal, a horizontal line signal (e.g., a horizontal synchronization signal) or a frame signal (e.g., a vertical synchronization signal). The first control signal S1 may be input to a shift register in the data drive unit 220.

The source start pulse may control the data sampling starting point of the data drive unit 220. The source sampling clock is a signal configured to control data sampling operations (e.g., in response to a rising or falling edge of a clock or other periodic timing signal).

The vertical polarity control signal POL controls the vertical polarity of data (e.g., in the form of a voltage) output from the data drive unit 220 to the panel 210. The horizontal polarity control signal controls the horizontal polarity of the data from the data drive unit 220 to the panel 210. The enable signal controls the output of data from the data drive unit 220.

A frame signal may be a signal (e.g., a periodic signal) defining one frame. For example, the period of the frame signal may be the length of time of one frame. In addition, the horizontal line signal may be a signal (e.g., a periodic signal) defining the period of time to write the data signal DATA to the pixels of one line in the pixel array of the panel 210 (e.g., a "horizontal period"). The period of the horizontal line signal may be one horizontal period.

For example, the second control signal S2 may include a gate start pulse, a gate shift clock signal, and/or a gate output enable signal. The gate start pulse may be a start signal applied to a first gate circuit, the gate shift clock signal may be a timing signal configured to shift the gate start pulse, and the gate output enable signal may be a signal configured to control the output of (e.g., the timing of an output signal from) the gate drive unit 240.

The third control signal S3 may include one or more control signals for controlling the sensing units in the touch-sensing block 250.

Figure 3:
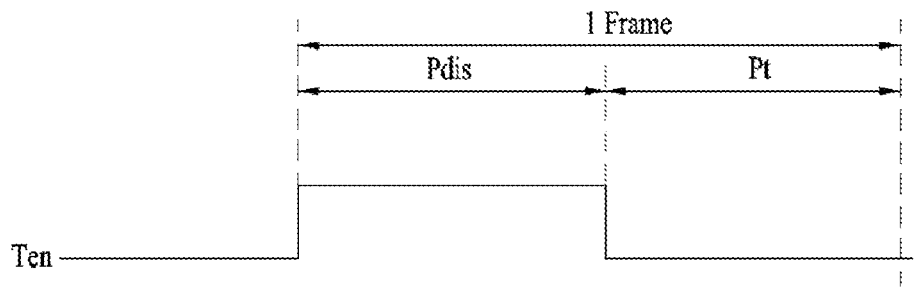
FIG. 3 is a diagram showing an exemplary frame.

FIG. 3 is a diagram showing one period of an exemplary frame.

Referring to FIG. 3, one frame of the display device 100 may include a display period Pd and a touch-sensing period Pt. Thus, the frame may be divided as a function of time into a first period for the display operation and a second period for the touch-sensing operation. The display period Pd and the touch-sensing period Pt may be defined by the state of a display enable signal Ten from the timing controller 220. For example, a first binary state of the display enable signal Ten may enable the display operation and disable the touch-sensing operation, and the complementary binary state of the display enable signal Ten may disable the display operation and enable the touch-sensing operation.

When the display period has finished, the pixel electrodes (e.g., the gate electrodes, the drain electrodes or the source electrodes) of the panel 210 float (e.g., are disconnected from any applied voltages). Due to overlap capacitance and coupling between the pixel electrodes, the pixel electrodes may not completely float (e.g., may be affected or influenced by nearby electromagnetic fields), and a capacitance may arise between the common electrodes and the pixel electrodes. Such capacitance may act as noise (hereinafter, referred to as "LCD noise") during the touch sensing operation (e.g., in the touch-sensing period). Errors or other malfunctions may occur in the calculation or determination of the presence or absence of a touch due to LCD noise.

Such LCD noise may be influenced by the polarity of the data provided to the data lines. For example, the level of noise may change depending on the polarity of the data provided to the data lines.

For example, LCD noise in a frame in which positive polarity data (+) is provided to the data lines may differ from that in a frame in which negative polarity data (−) is provided to the data lines.

Since LCD noise changes according to the polarity of the data, the change in capacitance of the sensing nodes due to touch sensing may change according to or depending on the polarity of the data provided to the panel 210 during the touch-sensing period Pt. Thus, the reliability of touch-sensing operations may deteriorate.

The data drive unit 230 provides data to the panel 210.

Figure 4:
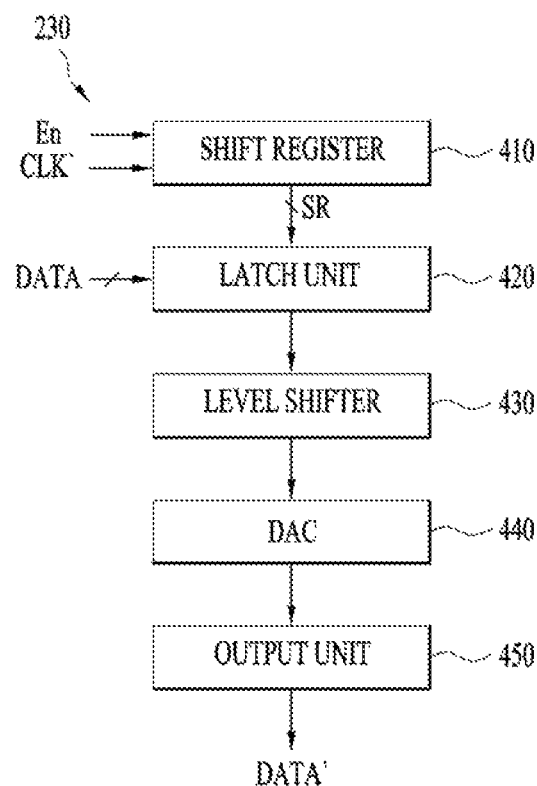
FIG. 4 is a diagram showing an exemplary embodiment of the data drive unit shown in FIG. 1.

FIG. 4 is a diagram showing one embodiment of the data drive unit shown in FIG. 1.

Referring to FIG. 4, the data drive unit 230 may include a shift register 410, a latch unit 420, a level shifter 430, a digital-to-analog converter 440 and an output unit 450.

The shift register 410 may generate a shift signal SR in response to the enable signal En and the clock signal CLK' to control the timing of storing the data signal DATA in the latch unit 420.

The latch unit 420 may store the data signal DATA in response to the shift signal SR. The level shifter 430 may shift the level or change the upper voltage of the data signal DATA stored in the latch unit 420. For example, the level shifter 430 may increase the voltage of high binary logic data in the data signal from 1.8 V or 2.5 V to 3.3 V or 5 V, etc.

The digital-to-analog converter 440 may convert the digital data signal, the upper voltage level of which has been shifted, into an analog signal.

The output unit 450 may amplify (or buffer) the analog signal output from the digital-to-analog converter 440 and provide the amplified (or buffered) analog signal DATA' to the panel 210 via the data lines DL1 to DLm (m being a natural number greater than 1).

In order to prevent deterioration of the liquid crystal in the panel 210, an inversion method comprising periodically inverting the polarity of the data voltage applied to the liquid crystal in the panel 210 may be used.

In order to implement the inversion method, the data drive unit may provide positive polarity data or negative polarity data to the panel 210, based on or depending on the value of the vertical polarity control signal POL and the data signal DATA.

The polarity inversion may be implemented by the digital-to-analog converter 440 or the output unit 450.

Figure 5A:
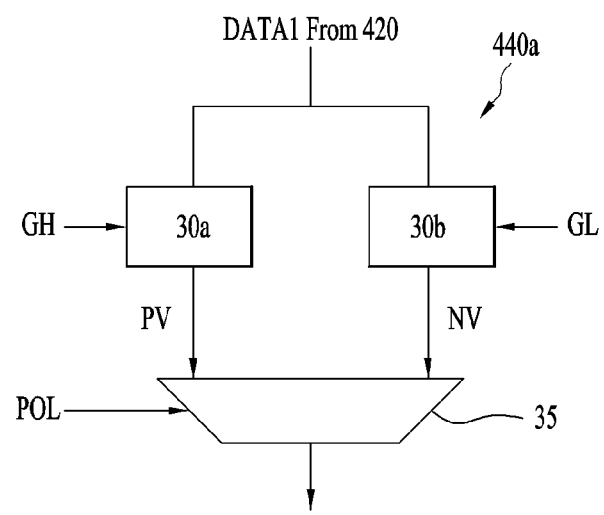
FIG. 5A is a diagram showing a digital-to-analog converter 440a according to an exemplary embodiment, configured to implement an inversion method.

FIG. 5A is a diagram showing the digital-to-analog converter 440a according to one embodiment configured to implement an exemplary polarity inversion method.

Referring to FIG. 5A, the digital-to-analog converter 440 may include a first decoder 30a, to which a positive gamma reference voltage GH is supplied, a second decoder 30b, to which a negative gamma reference voltage GL is supplied, and a selector 35 configured to select and output one of the outputs of the first and second decoders 30a and 30b based on or depending on the state of the vertical polarity control signal POL.

FIG. 5A shows the digital-to-analog converter 440 corresponding to one data line, and the digital-to-analog converter 440a according to various embodiments may include first and second decoders 30a and 30b corresponding to each data line and the selector 35.

The first decoder 30a may output a positive polarity voltage PV after decoding the data signal DATA1, the voltage level of which has been shifted, from the level shifter 420. The second decoder 30b may output a negative polarity voltage NV after decoding the data signal DATA1, the voltage level of which has been shifted.

The selector 35 may output the positive polarity voltage PV or the negative polarity voltage NV based on the vertical polarity control signal POL (or a binary logic state thereof).

The output unit 450 may output the positive polarity data (+) or the negative polarity data (−) after buffering the positive polarity voltage PV or the negative polarity voltage NV, respectively. For example, the positive polarity data may have a voltage higher than the common voltage Vcom applied to the common electrodes in each group of pixels (see, e.g., FIG. 2), and the negative polarity data may have a voltage lower than the common voltage Vcom.

Figure 5B:
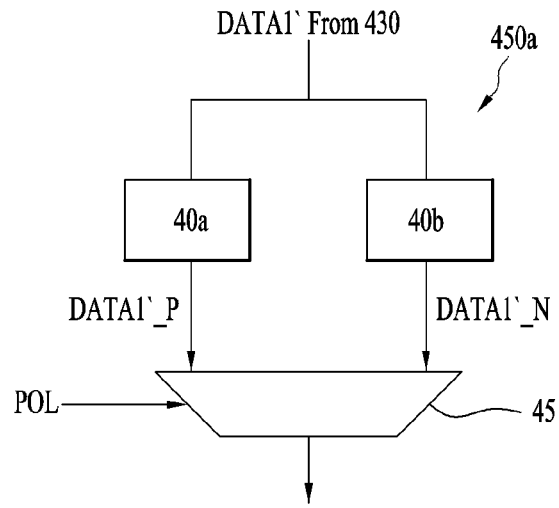
FIG. 5B is a diagram showing an example of an output unit according to an embodiment configured to implement the same or a different inversion method.

FIG. 5B is a diagram showing the output unit 450a according to one or more embodiments configured to implement the same or different polarity inversion method.

Referring to FIG. 5B, the output unit 450a may include a first amplifier 40a configured to output a positive polarity data signal DATA1'_P after amplifying the analog signal DATA1' output from the digital-to-analog converter (e.g., digital-to-analog converter 440), a second amplifier 40b configured to output a negative polarity data signal DATA1'_N after amplifying the analog signal DATA1', and a selector 45 configured to output the positive polarity data signal DATA1'_P or the negative polarity data signal DATA1'_N based on or depending on the state of the polarity control signal POL.

For example, the positive polarity data may have a voltage higher than the common voltage Vcom applied to the common electrodes in each group of pixels (see, e.g., FIG. 2), and the negative polarity data may have a voltage lower than the common voltage Vcom.

The polarity inversion methods are not limited to the above descriptions, and may be implemented in various manners using a polarity control signal. The inversion method according to one or more embodiments may include a frame inversion method comprising alternately changing the polarity of data in each successive frame. Embodiments of the invention are not limited thereto, and a dot inversion method or a column inversion method may be used in other embodiments.

Referring back to FIG. 1, the gate drive unit 240 may drive the gate lines GL1 to GLn (n being a natural number greater than 1) in response to the second control signal S2.

For example, the gate drive unit 240 may output the gate driving signals G1 to Gn (n being a natural number greater than 1) to the gate lines GL1 to GLn (n being a natural number greater than 1) in response to the second control signal S2. The transistors TR in the display pixels connected to each of the gate lines may be turned on or off depending on the state of the gate driving signals G1 to Gn (n being a natural number greater than 1).

FIG. 6 is a diagram showing one or more embodiments of the timing controller 220 shown in FIG. 1.

Referring to FIG. 6, the timing controller 220 may generate first to third control signals S1 to S3 based on the clock signal CLK, the data signal DATA, a horizontal synchronization signal Hys, a vertical synchronization Vsy, and a control signal Sc received from a host (e.g., which includes the host controller 310). For example, the vertical synchronization signal Vsy may be a signal defining a frame (e.g., a signal or pulse having a transition at the start or end of each frame, wherein successive transitions of the same type [e.g., rising or falling] define the period or length of one frame). The vertical synchronization signal Vsy may be a periodic signal, and one period of the vertical synchronization signal Vsy may be the period or length of one frame. For example, the horizontal synchronization signal Hys may be a signal defining the period of time to write data into the pixels of one line in the pixel array of the panel 210. The horizontal synchronization signal Hys may be a periodic signal, and one period of the horizontal synchronization signal may be the period or length of one horizontal period.

The timing controller 220 may generate state information (e.g., a state signal Ps) based on at least one of the first to third control signals S1 to S3.

The timing controller 220 may include a control signal generator 222 configured to generate the first to third control signals S1 to S3 based on the signals CLK, DATA, Hys, Vsy and Sc received from a host controller 310 and a state information provider 224 configured to generate the state information (e.g., the state signal Ps) based on at least one of the first to third control signals S1 to S3.

In one embodiment, the state information provider 224 may generate the state information (e.g., the state signal Ps) based on the vertical polarity control signal POL. In this embodiment, the following state of the panel 210 may be checked via or indicated by the state signal Ps. Based on the vertical polarity control signal POL or a state thereof, the selection of positive polarity (+) or negative polarity (−) for the data to the pixels of the panel 210 may be checked or indicated. For example, the state signal Ps may have a value corresponding to the state of the vertical polarity control signal POL, or the selection of positive polarity (+) or negative polarity (−).

In another embodiment, the state information provider 224 may generate the state information (e.g., the state signal) Ps based on the vertical synchronization signal Vsy, the display enable signal Ten, and the vertical polarity control signal POL.

In this embodiment, the following state(s) of the panel 210 may be checked via or indicated by the state signal Ps. First, based on the display enable signal Ten or a state thereof, the occurrence of or the end of a display operation may be checked or indicated. Based on the vertical synchronization signal Vsy or a state thereof, the end of a frame may be checked or indicated. In addition, based on the vertical polarity control signal POL or a state thereof, the selection of positive polarity (+) or negative polarity (−) for the data to the pixels of the panel 210 may be checked. For example, the state signal Ps may be or comprise a multi-bit (e.g., 3-bit) signal in which the states of the display operation, the end of a frame, and the polarity of the data to the pixels may be indicated by the value of a bit in the multi-bit signal.

in yet another embodiment, the state information provider 224 may generate the state signal Ps based on the horizontal synchronization signal Hsy, the vertical synchronization signal Vsy, the display enable signal Ten, and the vertical polarity control signal POL. In this embodiment, the state information provider 224 may further confirm whether a data writing operation to a horizontal line is ongoing or has ended via the horizontal synchronization signal Hsy. For example, the state signal Ps may be or comprise a multi-bit (e.g., 4-bit) signal in which the states of the display operation, the end of a frame, the polarity of the data to the pixels, and the data writing operation may be indicated by the value of a bit in the multi-bit signal.

Referring back to FIG. 1, the touch-sensing block 250 may provide driving signals to the common electrodes SD11 to SDij (i and j being natural numbers greater than 1), which are the sensing nodes during the touch-sensing operation (or touch-sensing mode defined in part by the time period Pt; see FIG. 3), and sense the signals received via the common electrodes SD11 to SDij (i and j being natural numbers greater than 1) according to a change in the self-capacitance of the common electrodes SD11 to SDij (i and j being natural numbers greater than 1) or a change in the mutual capacitance between the common electrodes due to a touch.

In the display period Pd, the common voltage Vcom may be provided to the common electrodes SD11 to SDij (i and j being natural numbers greater than 1).

Referring to FIG. 2, the panel 210 may further include sensing lines L11 to Lij (i and j being natural numbers greater than 1) connected to the common electrodes SD11 to SDij (i and j being natural numbers greater than 1).

The touch-sensing block 250 may output a changed value of the raw data (e.g., the actual value of the raw data) after sensing a change in the capacitance (or sensing the capacitance) of the sensing lines L11 to Lij (i and j being natural numbers greater than 1).

The touch-sensing block 250 may calculate or determine the presence or absence of a touch on or over the sensing nodes and the coordinate information of the touched sensing node(s) based on the state information (e.g., state signal Ps) received from the state information provider 224 and the changed value of the raw data (e.g., the actual value of the raw data).

For example, the changed value of the raw data may be a difference between the raw data value of the sensing node when touch is absent and a current raw data value. When the changed value of the raw data exceeds a reference data value, it may be determined that the sensing nodes are touched.

As described above, the change in capacitance of the sensing nodes sensed by the touch-sensing block 250 during the touch-sensing period Pt may differ depending on the polarity of the data provided to the panel 210 during the display period Pd. Thus, the changed value of the raw data (e.g., the actual value of the raw data) may change or otherwise be erroneous due to the data polarity-dependent change in capacitance of the sensing nodes.

The touch-sensing block 250 may obtain information on the polarity of the data provided to the panel in each frame from the state signal Ps, control or select the value of the reference data used to determine the presence or absence of a touch on the touch panel based on the data polarity information, and calculate or determine the presence or absence of a touch and the coordinate information of the touched sensing node(s) based on the (controlled or selected) reference data value and the changed (or actual) value of the raw data.

Figure 7:
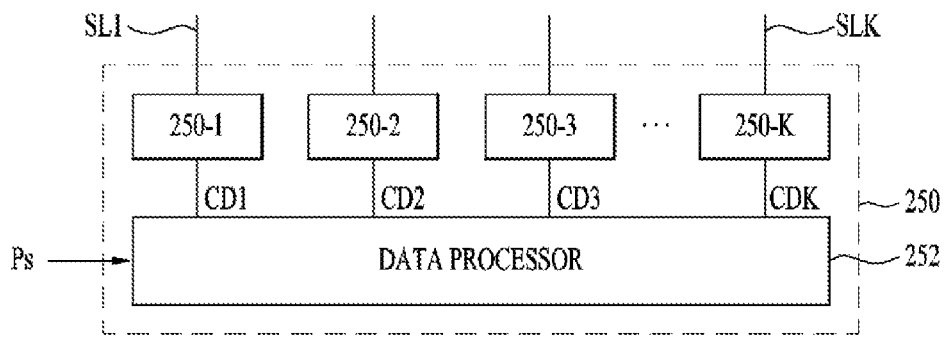
FIG. 7 is a diagram showing an exemplary embodiment of the touch-sensing block shown in FIG. 1.

FIG. 7 is a diagram showing one embodiment of the touch-sensing block 250 shown in FIG. 1.

The touch-sensing block 250 may include sensing units 250-1 to 250-$k$ ($k$ being a natural number greater than 1) connected to the sensing lines SL1 to SLk ($k$ being a natural number greater than 1) and a data processor 252 connected to the sensing units 250-1 to 250-$k$. The sensing lines SL1 to SLk ($k$ being a natural number greater than 1) may include at least some of the sensing lines L11 to Lij shown in FIG. 2. Alternatively, the sensing lines SL1 to SLk may be or comprise a selected (e.g., time-multiplexed) subset of the sensing lines L11 to Lij.

Each of the sensing units 250-1 to 250-$k$ may be connected to a corresponding one of the sensing lines SL1 to SLk ($k$ being a natural number greater than 1).

Each of the sensing units 250-1 to 250-$k$ may provide the driving signal to a corresponding one of the sensing nodes SD11 to SDij via a corresponding one of the sensing lines SL1 to SLk and output the changed value of the raw data (e.g., the actual value of the raw data) after sensing the change of capacitance (or sensing the actual capacitance) of a corresponding sensing node.

For example, each of the sensing units 250-1 to 250-$k$ may include a switch configured to supply and cut off the driving signal, at least one capacitor connected to the sensing line, an amplifier configured to amplify a signal received via the sensing line, and an analog-to-digital converter configured to convert the output of the amplifier into a digital signal (e.g., a multi-bit digital signal) and thereby sense the capacitance of the sensing node.

Alternatively, each of the sensing units 250-1 to 250-$k$ may further include a calculator configured to calculate a difference between the capacitance of the sensing node and a reference capacitance (e.g., a subtractor) and sense the change in the capacitance of the sensing node. For example, the reference capacitance may be the capacitance of the sensing node in the absence of any touch thereon or thereover. Alternatively, each of the sensing units 250-1 to 250-$k$ may further include a comparator configured to compare the sensed signal with a reference value (e.g., the reference capacitance). In one example, when the comparator determines that the digital signal has a value greater than the reference value, the comparator outputs a signal corresponding to a touch at or above the corresponding sensing node.

The data processor 252 may calculate or determine (1) the presence or absence of a touch on the touch panel and (2) coordinate information of the touched sensing node(s) based on the change in the value of the raw data from the sensing nodes received from the sensing units 250-1 to 250-$k$ and the state signal Ps received from the timing controller 220.

Figure 8:
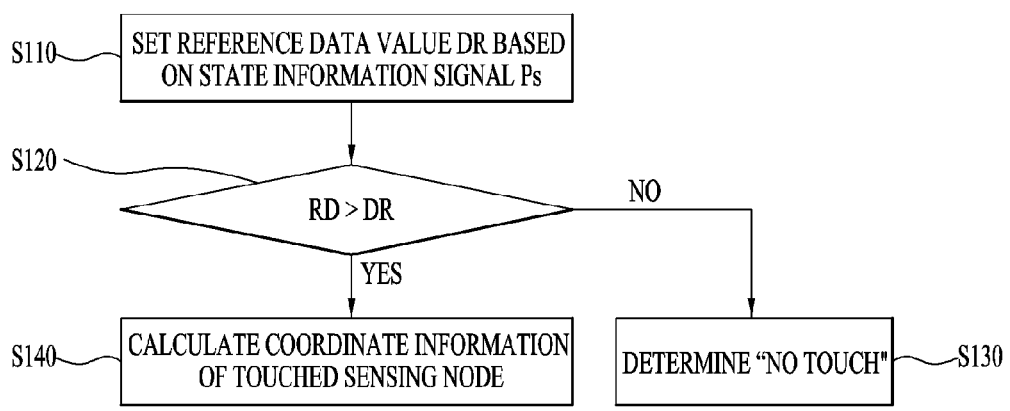
FIG. 8 is a diagram showing an exemplary embodiment of an operation configured to calculate coordinate information of touched sensing nodes (e.g., using the data processor shown in FIG. 7)

FIG. 8 is a diagram showing one embodiment of an operation for calculating the coordinate information of the touched sensing node(s) using the data processor 252 shown in FIG. 7.

Referring to FIG. 8, the data processor sets or controls the value DR of the reference data used to determine whether touch is present based on the state signal Ps (S110).

For example, when the pixels of the panel 210 are driven by the positive polarity data (+) during the display period based on the state signal Ps, the data processor 252 may set first reference data having a first reference value (e.g., a value corresponding to the capacitance on a sensing node that is not touched, in a pixel that has displayed positive polarity data during the same frame).

Alternatively, when the pixels of the panel 210 are driven by the negative polarity data (−) during the display period based on the state signal Ps, the data processor 252 may set second reference data having a second reference value (e.g., a value corresponding to the capacitance on a sensing node that is not touched, in a pixel that has displayed negative polarity data during the same frame). The first and second reference values of the reference data may be different from each other.

The data processor 252 determines whether the changed value of the raw data RD (e.g., the actual value of the raw data) of the sensing nodes received from the sensing units 250-1 to 250-$k$ exceeds the reference data value DR (S120).

The data processor 252 determines that a touch is absent (i.e., no touch) when the changed value of the raw data RD (e.g., the actual value of the raw data) of the sensing nodes does not exceed the reference data value DR (S130).

In contrast, the data processor 252 may determine that touch is present when the changed value of the raw data RD (e.g., the actual value of the raw data) of the sensing nodes exceeds the reference data value DR. Thereafter, the data processor 252 may calculate the position and/or the coordinates of the sensing nodes which are determined to be touched.

In various embodiments, by controlling the value of the reference data used to determine whether a touch is present or absent based on the polarity of the data provided to the panel 210 during the display period, it is possible to eliminate LCD noise, increase a touch signal to noise ratio, more accurately perform touch sensing, and improve touch-sensing reliability.

Figure 9:
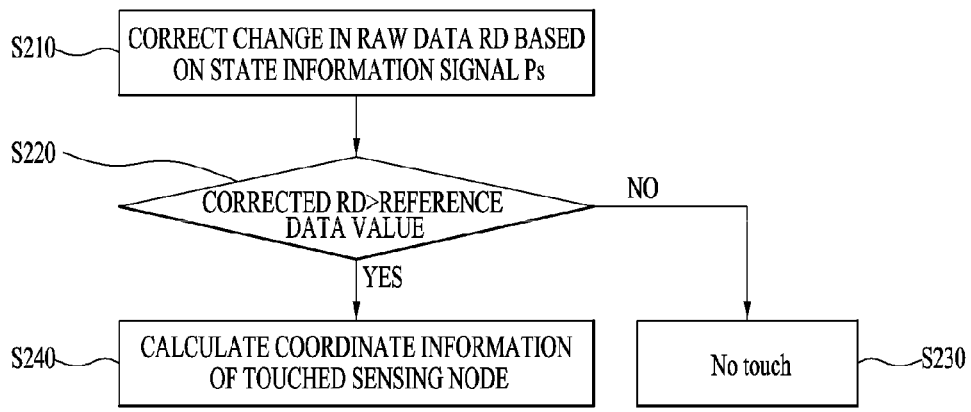
FIG. 9 is a diagram showing another exemplary embodiment of the operation configured to calculate coordinate information of touched sensing nodes (e.g., using the data processor shown in FIG. 7)

FIG. 9 is a diagram showing another embodiment of the operation for calculating the coordinate information of the touched sensing node(s) using the data processor 252 shown in FIG. 7.

Referring to FIG. 9, the data processor 252 corrects the changed value of the raw data RD (e.g., the actual value of the raw data RD) based on the state signal Ps (S210).

For example, the data processor 252 may confirm the polarity of the data provided to the pixels corresponding to the sensing nodes during the display period based on the state signal Ps. The data processor 252 may correct the changed value of the raw data (RD) (e.g., the actual value of the raw data as changed by the polarity of the data provided to the pixels) of the sensing nodes based on the polarity of the data provided to the pixels corresponding to the sensing nodes.

For example, the data processor 252 may correct the changed value of the raw data (e.g., the actual value of the raw data) of the sensing nodes based on a difference between the number of pieces of positive polarity data (e.g., the number of positive polarity data signals) and the number of pieces of negative polarity data (e.g., the number of negative polarity data signals) provided to the pixels corresponding to the sensing nodes.

The data processor 252 determines whether the corrected changed value of the raw data RD (e.g., the corrected value of the raw data) exceeds the reference data value (S220).

The data processor 252 determines that a touch is absent (i.e., there is no touch) when the corrected changed value of the raw data RD (e.g., the corrected value of the raw data) does not exceed the reference data value (S230).

In contrast, the data processor 252 may determine that a touch has occurred (i.e., touch is present) when the corrected changed value of the raw data RD (e.g., the corrected value of the raw data) exceeds the reference data value. Thereafter, the data processor 252 may calculate the position and/or coordinates of the sensing node which is determined to be touched.

Figure 10:
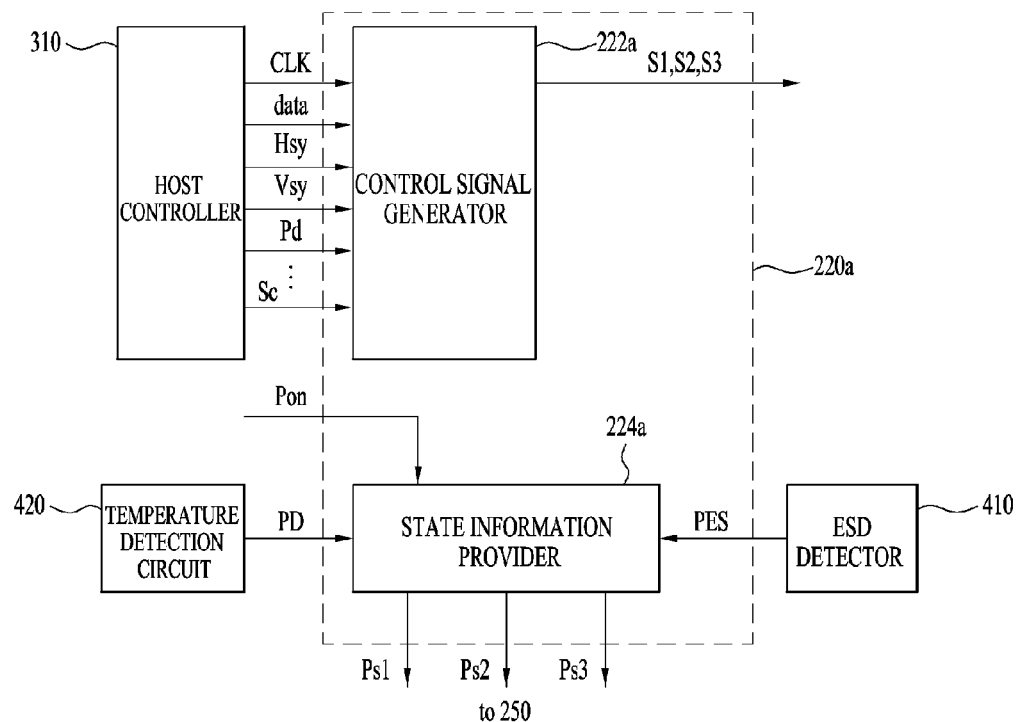
FIG. 10 is a diagram showing another exemplary embodiment of the timing controller shown in FIG. 1.

FIG. 10 is a diagram showing another embodiment 220a of the timing controller shown in FIG. 1. The same reference numerals as FIG. 6 indicate the same components, and the description of these same components will be brief or will be omitted so as to not obscure features of this embodiment.

Referring to FIG. 10, the timing controller 220a may include a control signal generator 222a and a state information provider 224a.

As described with reference to FIG. 6, the control signal generator 222a may generate first to third control signals S1 to S3 in response to the timing signal CLK, horizontal synchronization signal Hsy, vertical synchronization signal Vsy, frame timing signal Pd, control signal Sc, and/or the data (e.g., from the host).

The state information provider 224a may generate or provide a first state control signal Ps1, a second state control signal Ps2, and a third state control signal Ps3.

The first and second state control signals Ps1 and Ps2 may be related to an abnormal state or condition of the panel 210.

The first state control signal Ps1 may have a state that depends on the inflow of electrostatic discharge (ESD) into the panel. For example, when ESD flows into the panel 210, the first state control signal Ps1 may have a first binary logic state, and when ESD is not flowing into the panel 210, the first state control signal Ps1 may have a second binary logic state. The first state control signal Ps1 may have a binary logic state that corresponds to (e.g., is the same as or the inverse of) the binary logic state of the ESD detection signal PES from the ESD detector 410. When the voltage or current applied to the power supply terminal of the panel 210 exceeds a predetermined reference value, the first state control signal Ps1 may have the first binary logic state, and it may be determined that ESD is flowing into the panel.

The display apparatus 100 may further include an ESD detection circuit 410 configured to generate an ESD detection signal PES.

For example, the ESD detection circuit 410 may detect the voltage or current applied to the power supply terminal of the panel 210 and output the ESD detection signal PES depending on whether the detected voltage or current exceeds the predetermined reference value. The state information provider 224*a* may generate or provide the first state control signal Ps1 (or the state thereof) based on the ESD detection signal PES (or the state thereof).

As ESD flows into the panel 210, a change in the raw data from the sensing nodes may be adversely influenced, and thus, a malfunction may occur in touch sensing.

In order to prevent such malfunctions in touch sensing due to the inflow of ESD, the data processor 250 may exclude the raw data from the sensing nodes when it is determined that ESD is flowing into the panel (e.g., based on the first state control signal Ps1 and/or the ESD detection signal PES, or a binary logic state thereof). The data processor 252 (FIG. 7) may include a data storage unit configured to store the raw data from the sensing nodes (e.g., one or more registers). When it is determined that ESD is flowing into the panel, the data processor 252 may not overwrite the raw data stored in the data storage unit, and use the raw data from the sensing nodes that was stored in the data storage unit before the first state control signal Ps1 and/or the ESD detection signal PES changed state.

The second state control signal Ps2 may be generated or provided according to a change in the peripheral temperature of the panel 210. That is, a change in the peripheral temperature of the panel 210 may be confirmed by the second state control signal Ps2.

The display device 100 according to one or more embodiments may further include a temperature detection circuit 420 configured to measure the peripheral temperature of the panel 210. In one example, the temperature detection circuit 420 may include a thermistor having a resistance value that changes according to the peripheral temperature.

The temperature detection circuit 420 may output a temperature detection signal PD after measuring the peripheral temperature of the panel 210, and the state information provider 224*a* may generate or provide the second state control signal Ps2 based on the temperature detection signal PD. For example, the second state control signal Ps2 may have a binary logic state corresponding to the peripheral temperature being above or below a threshold temperature. Here, the peripheral temperature of the panel 210 may be the temperature of one or more of the components of the display device 100 located near the panel 210.

When the peripheral temperature of the panel 210 increases beyond a normal (or threshold) value, the value of the raw data from the sensing nodes may be adversely influenced, and thus, a malfunction may occur in touch sensing.

In order to prevent the malfunction in touch sensing according to the change in the peripheral temperature of the panel 210, the data processor 250 may exclude the raw data from the sensing node when the peripheral temperature of the panel 210 increases beyond a normal (or threshold) value, based on the second state control signal Ps2 (or a state thereof) and/or the temperature detection signal PD (or a value thereof).

Alternatively, the data processor 250 may change a reference data value used to determine whether a touch is present or absent based on the second state control signal Ps2 (or a state thereof) and/or the temperature detection signal PD (or a value thereof), and calculate or determine the presence or absence of the touch and the coordinate information of the touched sensing node based on the changed reference data value.

In an additional or further alternative, the data processor 250 may correct a change in the raw data from the sensing nodes based on the second state control signal Ps2 (or a state thereof) and/or the temperature detection signal PD (or a value thereof), and calculate or determine the presence or absence of a touch and the coordinate information of the touched sensing node based on the corrected change in the raw data.

The third state control signal Ps3 may be related to a specific function of the display device 100.

For example, the third state control signal Ps3 may be related to a "knock-on" operation of the display device 100. Here, the "knock-on" operation may refer to a tap being consecutively sensed at least twice within a predetermined or restricted time period. For example, when a second tap is sensed within a predetermined or restricted time after a first tap is sensed, it may be determined that a "knock-on" operation has been performed.

The "knock-on" operation may be performed, detected or determined using different methods according to the on or off state of the panel 210.

For example, when the panel 210 is in an on state, the touch-sensing block 250 may perform or operate in an active mode, which may be considered to be an active state, so as to immediately respond to user input.

When the panel 210 is in an off state, in order to save battery life, the touch-sensing block 250 may switch (e.g., perform or operate in a mode for switching) between the active state and an inactive state at a predetermined time and/or during a predetermined period. That is, when the panel 210 is in an off state, the touch-sensing block 250 may be activated at the predetermined time and/or during a predetermined period.

The shorter the predetermined period that the touch-sensing block 250 is in the active state, the greater the speed with which the panel 210 may sense a knock-on operation, but power consumption in the touch-sensing block 250 may increase as a result. In contrast, the longer the predetermined period that the touch-sensing block 250 is in the active state, the power consumption may be relatively smaller, but the knock-on operation sensing speed of the panel 210 may also decrease.

The state information provider 224*a* may generate or provide the third state control signal Ps3 based on a signal Pon indicating the on or off state of the panel 210. For example, the signal Pon may have a first binary logic state when the panel 210 is on and a second binary logic state when the panel 210 is off.

The value of the raw data from the sensing node(s) may be influenced by the on or off state of the panel 210. The data processor 250 may thus change the reference data value used to determine whether a touch is present or absent based on the third state control signal Ps3, and calculate or determine the presence or absence of a touch and the coordinate information of the touched sensing node(s) based on the changed reference data value.

For example, the data processor 250 may set the reference data value when the panel 210 is in an off state to be lower than the reference data value when the panel 210 is in an on state.

Alternatively, the data processor 250 may correct a change in the raw data from the sensing nodes based on the third state control signal Ps3, and calculate or determine the presence or absence of a touch and the coordinate information of the touched sensing node(s) based on the corrected change in the raw data.

An exemplary method of sensing a touch of or on the display device 100 (or the touch sensor) having the panel 210 including display pixels and sensing nodes P11 to Pnm will now be described.

The method of sensing a touch according to one or more embodiments of the invention may include generating a change in raw data after sensing a change in the capacitance of the sensing nodes P11 to Pnm, generating or providing state information (e.g., the state signals Ps and/or Ps1 to Ps3) based on at least one of the polarity of data for driving the panel 210, the peripheral temperature of the panel, the presence or absence of ESD inflow into the panel, and/or the on or off state of the panel, and sensing the touch on or over the sensing nodes P11 to Pnm based on the state signals Ps and Ps1 to Ps3 and the change in the raw data RD.

Sensing the touch may include controlling a reference data value DR for determining whether the touch is present or absent based on one or more of the state signals Ps and Ps1 to Ps3, and determining whether the touch on or over the sensing nodes P11 to Pnm is present or absent based on the (controlled) reference data value DR and the change in the raw data RD.

Alternatively, sensing the touch may include correcting the change in the raw data RD based on one or more of the state signals Ps and Ps1 to Ps3, and determining whether the touch on or over the sensing nodes P11 to Pnm is present or absent based on the reference data value DR used to determine whether the touch is present or absent.

The description(s) of FIGS. 1 to 10 are applicable to embodiments of the present method.

Although the display device 100 of FIG. 1 uses the common electrodes as the sensing electrodes, embodiments are not limited thereto. In other embodiments, the display electrodes, for example, a corresponding one or more of the gate electrodes, the source electrodes and the drain electrodes of the pixel may be used as the sensing electrode.

In addition, in order to reduce parasitic capacitance between the sensing electrodes and the display electrodes, a guard signal (not shown) may be provided to at least one of the display electrodes during the sensing period.

For example, a difference between the guard signal and the driving signal provided to the sensing nodes may be constant. For example, the guard signal may have a voltage or other value equal to that of the driving signal. For example, the guard signal may have a frequency, phase, shape and/or amplitude equal to the driving signal.

According to embodiments of the invention, it is possible to accurately perform touch sensing and to improve touch-sensing reliability.

Features, structures, effects, and the like as described above are included in at least one embodiment of the present invention and should not be limited to only one embodiment. In addition, the features, structures, effects, and the like described in the respective embodiments may be combined or modified with respect to other embodiments by those skilled in the art. Accordingly, contents related to these combinations and modifications should be construed as within the scope of the present invention.

What is claimed is:

1. A touch sensor comprising:
a panel including display pixels and sensing nodes;
a sensing unit configured to output a changed value of raw data in response to a change in capacitance of the sensing nodes;
a timing controller configured to generate state information based on a polarity of data to the panel; and
a data processor configured to determine a presence or absence of a touch on or over the sensing nodes based on the changed value of the raw data relative to a reference data value,
wherein the data processor sets (i) a first reference value for the reference data value when the display pixels are driven by positive polarity data and (ii) a second reference value different from the first reference value for the reference data value when the display pixels are driven by negative polarity data.

2. The touch sensor according to claim 1, further comprising a data drive unit configured to provide the data to the panel, wherein the polarity of the data alternates in successive data frames.

3. The touch sensor according to claim 2, wherein the polarity of the data alternates between a positive polarity and a negative polarity in successive data frames.

4. The touch sensor according to claim 1, wherein the data processor controls the reference data value based on the state information and determines presence or absence of touch on or over the sensing nodes based on one of the first and second reference values and the change in the raw data.

5. The touch sensor according to claim 1, wherein the data processor corrects the change in the raw data based on the state information and determines the presence or absence of the touch on or over the sensing nodes based on the corrected change in the raw data and the reference data value.

6. The touch sensor according to claim 5, wherein:
the display pixels comprise a plurality of groups,
each of the plurality of groups includes two or more display pixels sharing one common electrode, and
the sensing nodes comprise the common electrodes.

7. The touch sensor according to claim 6, wherein the data processor corrects the change in the raw data from the sensing nodes based on a difference between a number of positive polarity data and a number of negative polarity data.

8. The touch sensor according to claim 1, wherein the polarity of the data to the panel is a vertical polarity, and the state information comprises a vertical polarity control signal.

* * * * *